Feb. 3, 1953  W. G. FASTIE  2,627,530
AMBIENT-TEMPERATURE COMPENSATED DEVICE
Filed May 29, 1952  5 Sheets-Sheet 1
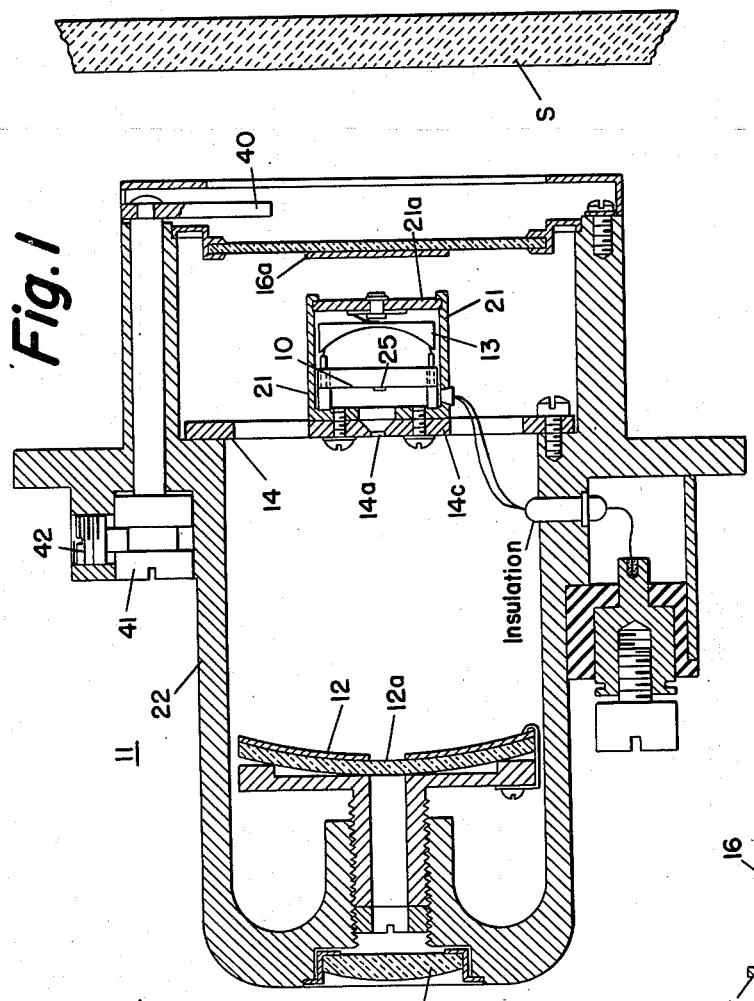
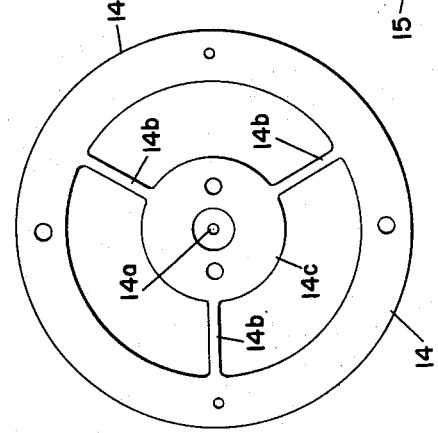
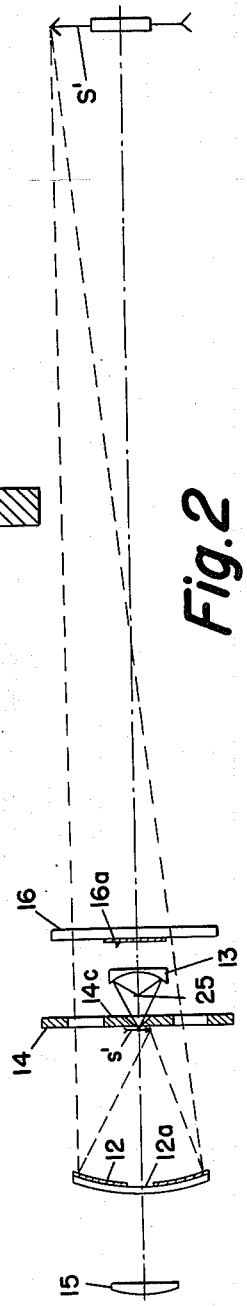
INVENTOR.
WILLIAM G. FASTIE
BY
Woodcock and Phelan
ATTORNEYS Feb. 3, 1953 W. G. FASTIE 2,627,530
AMBIENT-TEMPERATURE COMPENSATED DEVICE
Filed May 29, 1952 5 Sheets-Sheet 3

INVENTOR.
WILLIAM G. FASTIE
BY
Woodcock and Phelan
ATTORNEYS

Feb. 3, 1953 W. G. FASTIE 2,627,530
AMBIENT-TEMPERATURE COMPENSATED DEVICE
Filed May 29, 1952 5 Sheets—Sheet 4

INVENTOR.
WILLIAM G. FASTIE
BY
Woodcock and Phelan
ATTORNEYS

Feb. 3, 1953 W. G. FASTIE 2,627,530
AMBIENT-TEMPERATURE COMPENSATED DEVICE
Filed May 29, 1952 5 Sheets—Sheet 5

INVENTOR.
WILLIAM G. FASTIE
BY
Woodcock and Phelan
ATTORNEYS

UNITED STATES PATENT OFFICE 2,627,530

AMBIENT-TEMPERATURE COMPENSATED DEVICE

William G. Fastie, Owings Mills, Md., assignor to Leeds and Northrup Company, Philadelphia, Pa., a corporation of Pennsylvania Application May 29, 1952, Serial No. 290,665

2 Claims. (Cl. 136—4)

This invention relates to electrical measuring apparatus which includes a thermocouple, a thermopile, a temperature or radiation-sensitive resistor element, or analogous structure for measuring the intensity of radiant heat, such for example, as received from a radiant body, and has for an object the provision of a structure including a heat-sensitive element by means of which there may be derived from an electrical characteristic of that element an electrical output substantially unaffected by ambient temperature. Structures of the character to which my invention is applicable are not only especially useful in the pyrometry field where it is desired to measure temperatures ranging from 300° F. to 4500° F., but also have utility generally in devices which involve measurement of radiant energy, as for example, the measurement of quantities or properties of material interposed between the structure and a source of radiant energy. There are many types of such equipment used for determination of density, material composition, etc., utilizing the transmission characteristics of the material to change the radiation received by the responsive element from a source.

The present application is a continuation-in-part of earlier filed application Serial No. 139,308, filed January 18, 1950, now United States Patent No. 2,601,508, and with respect to which an application Serial No. 304,454 has been filed for reissue of said patent.

In Quereau Reissue Patent 19,564, there is disclosed a compensated thermopile in which the thermocouples are constructed of iron and constantan. In accordance with the teachings of the Quereau patent, the tendency of the temperature-difference to decrease with an increase of ambient temperature is compensated for by the rising voltage-temperature characteristic of the elements of the thermopile. In order that the tendency of the temperature-difference to decrease may be compensated by the rising voltage-temperature characteristic, Quereau proposed, among other things, the lowering of the thermal resistance between the hot and cold junctions, as by increasing the diameter of the thermocouple wires, so that heat could be rapidly removed by conduction from the hot junctions and the target. By this construction, radiation loss from the receiver, with resultant lowering of its temperature with respect to its surroundings, was minimized. In practice, the thermocouple wires of the Quereau thermopile were one-hundredth of an inch in diameter with a target size of one-half inch diameter. One difficulty with the thermopile of the Quereau type has been the relatively heavy mass of the thermocouple wires and the target resulting in undesirably low sensitivity and a relatively long response time. Such thermopiles have been found inapplicable to temperature measurements in the high-temperature pyrometric field where the requirements are short response time and high sensitivity.

In an effort to overcome some of the undesirable features of the Quereau type of thermopile, it has been proposed to make thermopiles of low heat capacity, low heat conductivity and of thermopile materials having a rising voltage-temperature characteristic. In most thermopiles of the last-mentioned type, the tendency of the temperature-difference to decrease with an increase of ambient temperature is not entirely compensated for by the rising voltage-temperature characteristic of the thermopile. Accordingly, it has been proposed to connect in parallel with the output terminals of the thermopile a compensating coil comprising a resistor having a suitable temperature coefficient of resistivity to provide the additional compensation needed to correct the thermopile output for ambient temperature effect.

In accordance with the present invention, it has been recognized that a number of materials ordinarily used to form thermocouples have positive temperature coefficients of heat conductivity, that is, the heat conduction increases with rise in temperature level for the same temperature-difference, and it has been further recognized that other materials have negative temperature coefficients of conductivity, i. e., the heat conduction decreases with a rise in temperature level for the same temperature-difference. More particularly, Chromel, constantan and gold-nickel alloys have positive temperature coefficients of conductivity, and iron, nickel, copper and others have negative co-efficients of conductivity. In the compensated thermopile of Quereau, the iron and constantan components of each thermocouple act oppositely because of the opposite sign of their coefficients of conductivity. The values of thermal conductivity of constantan and iron and the values of their temperature coefficients of thermal conductivity are such that the net thermal conductivity, for given equal length and equal 10 mil diameter wires of an iron constantan thermocouple, does not appear to change with change in ambient temperature level over a range as from 18° C.

to 100° C. In thermopiles including elements of Chromel and constantan alloys, both elements have an increasing (positive) conductivity-temperature characteristic which tends to decrease the output voltage with increasing ambient temperature. Furthermore, the loss of energy from the thermopile receiver through gaseous conduction also increases with increasing ambient temperature, further tending to decrease the output voltage. Furthermore, radiation loss from the thermopile receiver increases with increasing ambient temperature, further reducing the output voltage. The rising voltage-temperature characteristic of Chromel-constantan is insufficient completely to offset all of these effects, no matter what wire dimensions or receive dimensions, or gas is used, so that some form of compensator must be used to correct for the ambient temperature error of a Chromel-constantan thermocouple. It is desirable to use Chromel-constantan for thermocouples because of its strength, large thermoelectric effect, low thermal conductivity and thermoelectric stability.

Further in accordance with the present invention it has been found that the response of thermopiles constructed of many different kinds of thermocouple elements may be made independent of ambient temperature, and further that the principles of the invention are applicable to other temperature-sensitive elements, such as temperature-sensitive resistors as used in bolometers.

For further objects and advantages of the invention and for a more detailed understanding of the invention, reference is to be had to the following description taken in conjunction with the the accompanying drawings in which:

Fig. 1 is a sectional view of a radiation pyrometer embodying the invention;

Fig. 2 diagrammatically illustrates the optical system of Fig. 1;

Fig. 3 is a plan view of the part 14 of Fig. 1;

Figure 7:
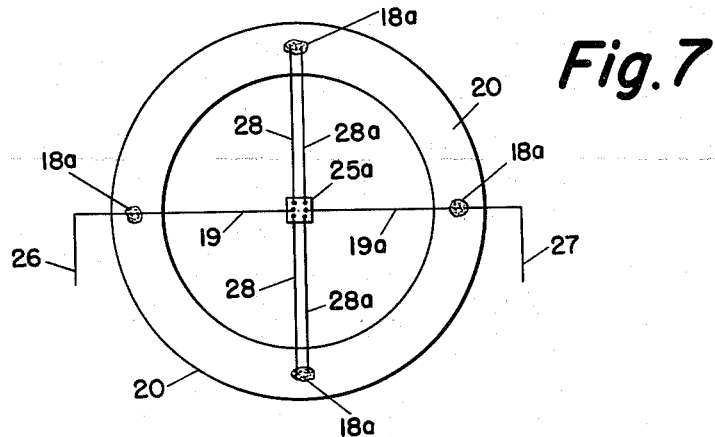
Figure 8:
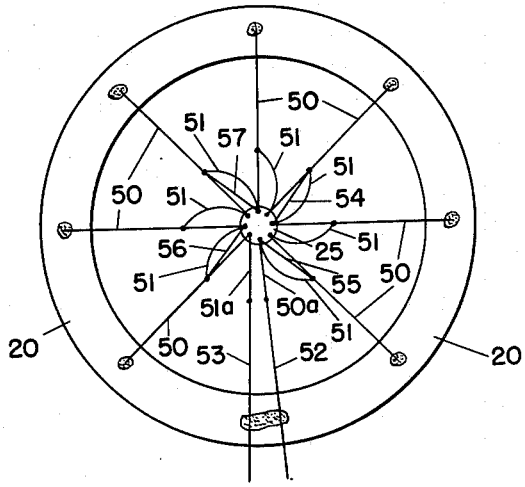
Figure 9:
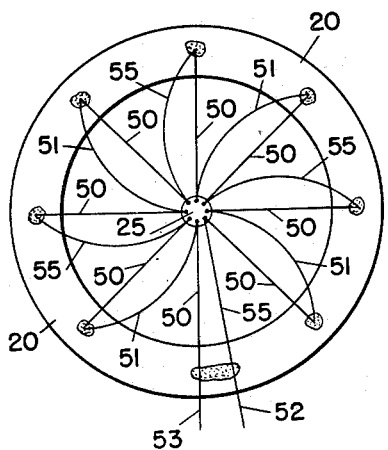
Figure 10:
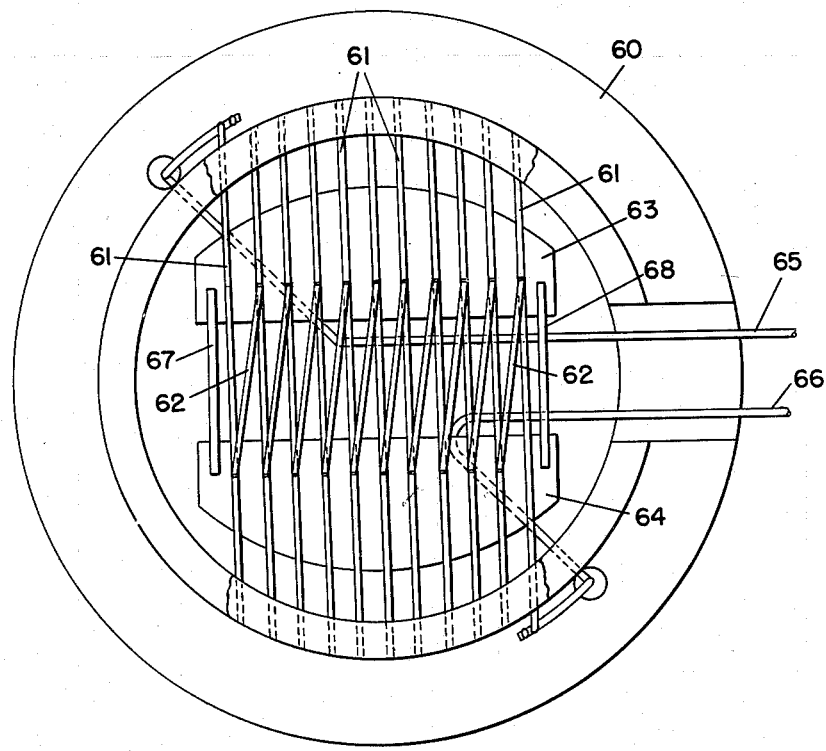
Figure 6:
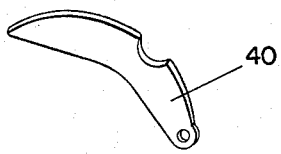
Figure 11:
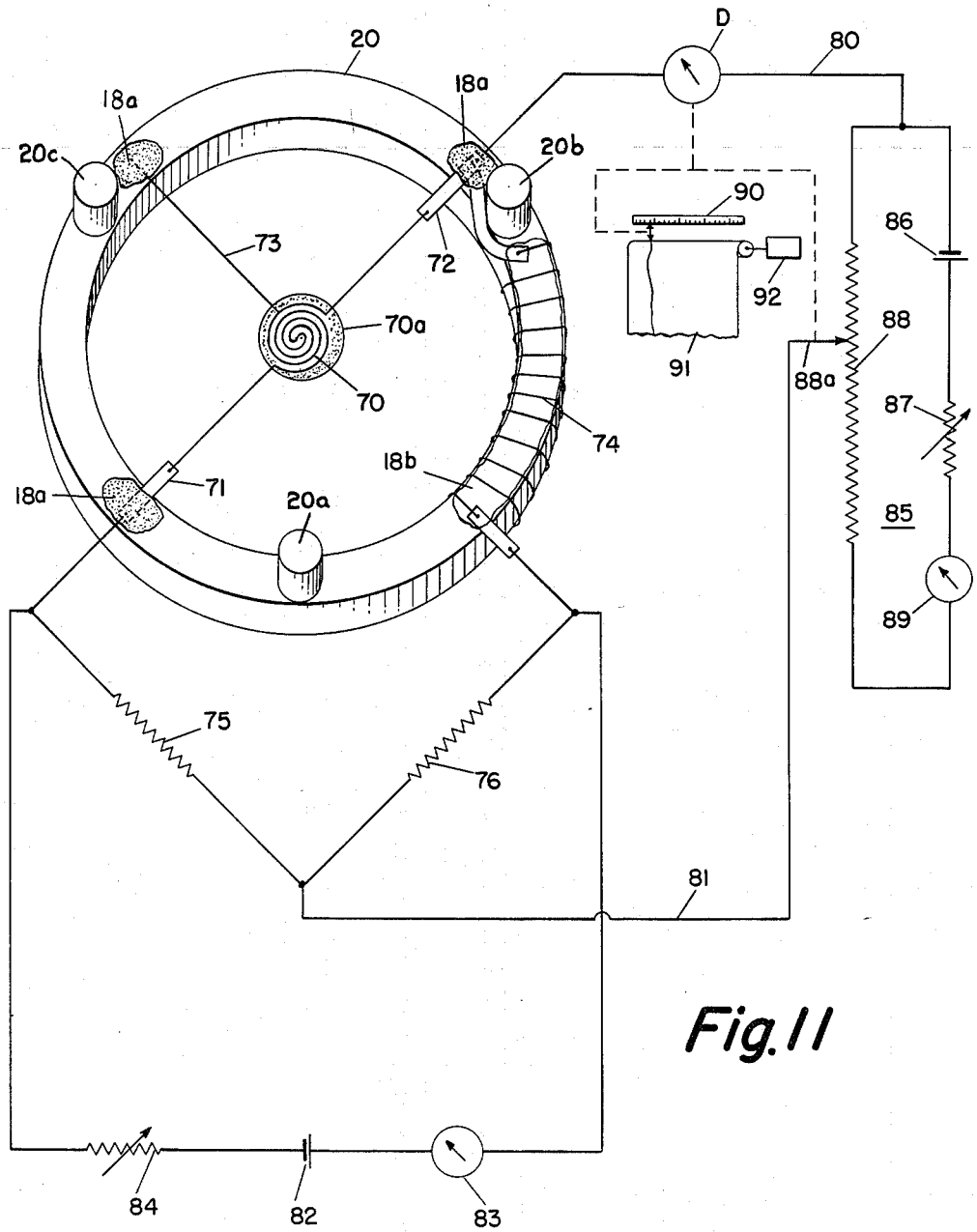

Fig. 6 is a perspective view of an adjustable light trimmer 40 secured to the shank of a screw 41 in Fig. 1 which can be locked in fixed position by a locking screw 42;

Fig. 7 is a plan view of a thermopile assembly of a thermopile embodying the invention;

Figs. 8, 9 and 10 are plan views respectively of further modifications of thermopile assemblies embodying the invention; and Fig. 11 diagrammatically illustrates a further modification of the invention.

Referring to the drawings, the invention in one form has been shown applied to the sensitive element or thermopile 10 of a radiation pyrometer 11 which includes a suitable optical system of the type disclosed and claimed in an application Serial No. 154,690, filed April 7, 1950, by Raymond C. Machler for Improved Optical Systems for Radiation Pyrometers, and assigned to the same assignee as the present invention. The optical system of the radiation pyrometer 11 limits the energy received by the thermopile to that emanating from a sharply defined area of the surface of a hot body S and produces a radiant energy flux of increased density at the sensitive element or detector 10 by employing a two-mirror optical system which includes the concave mirror 12 and the concave mirror 13. There are combined the energy-concentrating property of a wide angle optical element with the sharp image-forming property of a narrow angle optical element. In Fig. 1, the narrow angle primary mirror 12 produces on a diaphragm 14 an image of an area of source S, illustrated as a section of a refractory wall or other heat-radiating body. In Fig. 2 the selected area of source S is represented by an arrow S', and the image thereof by the arrow s'. Radiation from only the sharply defined portion of the source represented by that part of the image s' in front of opening 14a of the diaphragm passes through that opening 14a to the wide angle secondary mirror 13 which redirects and concentrates the received radiation upon the thermopile or detector 10. The mirror 13 forms an image of the opening 14a on the target of the thermopile, which image is smaller than the target 25, Fig. 2. Due to the mirror 13, the density of the radiant energy on the target of the detector is greater than it is at the opening 14a.

It is to be further observed that the mirror 12, because not silvered at its central portion, provides a transparent opening 12a through which there may be viewed through the eye-piece 15 the image s', Fig. 2, projected on the plate 14. It is a feature of the present invention to provide a coating of magnesium oxide on the black-painted surface of plate 14 facing opening or aperture 12a of mirror 12. The coating has the following properties: It does not scatter or reflect appreciable radiation in the infra-red region where the greater amount of radiant energy from hot bodies is located. Infra-red radiation is transmitted by the magnesium oxide layer and is absorbed by the black paint beneath it. Hence, that surface does not cause errors due to the presence of scattered radiation. Radiation entering pyrometer 11 from other than the optical line of sight is not reflected within the housing since all interior surfaces are coated with a dull black paint, except the window and mirrors. The magnesium oxide coating on top of the black paint makes visible an image of the sharply defined area of the source and, hence, provides a means by which the pyrometer may be sharply focused. A window 16 is provided to protect the interior of the instrument from ingress of foreign material. The eye-piece 15, the window 16 and the housing as a whole may be sealed for operation of the thermopile under subatmospheric or superatmospheric pressure. The window 16 may be made of quartz or other material which will pass energy in the infra-red region and which will withstand the heat to which it may be subjected in use.

When the thermopile is thermally insulated from its surroundings, the transient effects due to sudden changes in ambient temperature may be reduced. However, the insulated system does not permit absorbed radiant energy readily to leave the thermo-electric system, with the result that the thermopile can be heated to undesirably high operating temperatures if subjected to intense radiation. In accordance with the present invention, the thermopile is not thermally isolated, but nevertheless, its output is not to any substantial extent changed by a rapidly varying ambient temperature. This is accomplished by adjusting the physical dimensions of the parts associated with the cold junctions and the parts associated with the hot junctions, so that they respond in like manner to changes in ambient temperature. More particularly, it will be observed, Figs. 4 and 5, that the cold junctions 18 of the thermocouples 19 are in intimate heat-conductive relation with a metal mounting ring 20. Though electrically insulated therefrom, they are thermally intimately connected thereto as by a suitable ceramic cement or ceramic frit 18a. The mounting ring 20 may be of any suitable metal such as nickel or copper. The ring 20 is thermally connected to an outer housing 21, Figs. 1 and 5, through three metallic legs 20a, 20b and 20c which may be integral with the ring 20, or they may be riveted or welded inserts. The copper housing 21 including end-plate or closure 21a and plate 14 form a thermal shield completely surrounding the thermopile except for the opening 14a which allows radiation to pass to the mirror 13. The copper housing 21 is in thermal and metallic contact with the diaphragm 14, which is itself preferably made of heavy copper, and is along a shoulder of housing 22 in metallic and thermal contact with it. The diaphragm 14, Fig. 3, has three legs 14b spaced 120° apart interconnecting a central supporting disc 14c and the rim of the diaphragm. To increase the flow of heat from the thermopile housing 21 to the pyrometer housing 22, the legs 14b may be made larger, particularly in cross-sectional area. The size of the extensions 20a, 20b and 20c, Fig. 4, and the thickness of the copper legs 14b are so porportioned as to maintain the supporting disc and housing 21 at substantially ambient temperature. The thermal conduction thus provided is effective to achieve the foregoing objective when making measurements with the device as a whole in an intense radiation field.

Figure 5:
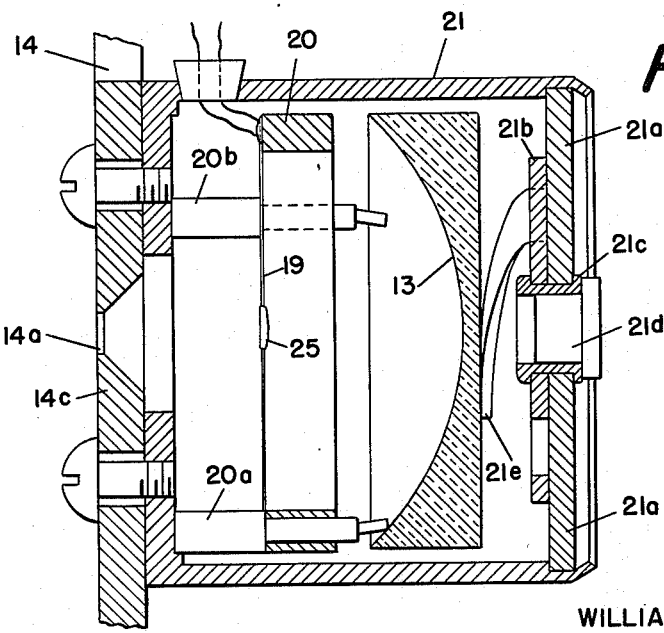
Fig. 5 is an enlarged sectional view of the sensitive element and including its housing, with member 14 of Fig. 1 secured thereto.

Referring to Fig. 5, it is to be observed the extensions 20a, 20b and 20c are formed by pins having enlarged end-portions which abut against the inturned ends of the housing 21 which receive the threaded ends of screws extending through the plate 14. The pins have reduced portions which are pressed into openings of the ring support 20 of the thermopile, and each pin is provided with a further reduced end-portions bent slightly toward the axis of the housing 21 for engaging at points spaced approximately 120° apart the concave face of the mirror 13, a spring extension 21e from member 21b engaging the back of the mirror 13 to press it against the ends of the three pins. The spring-carrying member 21b is secured to an end-plate or closure 21a of housing 21 by a hollow rivet 21c which is preferably provided with a block 21d to prevent entry of radiation into the housing 21. It is to be observed that the openings in plate 14 through which the fastening screws extend are made somewhat larger than the shank of the screws to provide for optical adjustment of housing 21 relative to the opening 14a in plate 14, thus providing for optical adjustment of the illustrated assembly with reference to plate 14.

Figure 4:
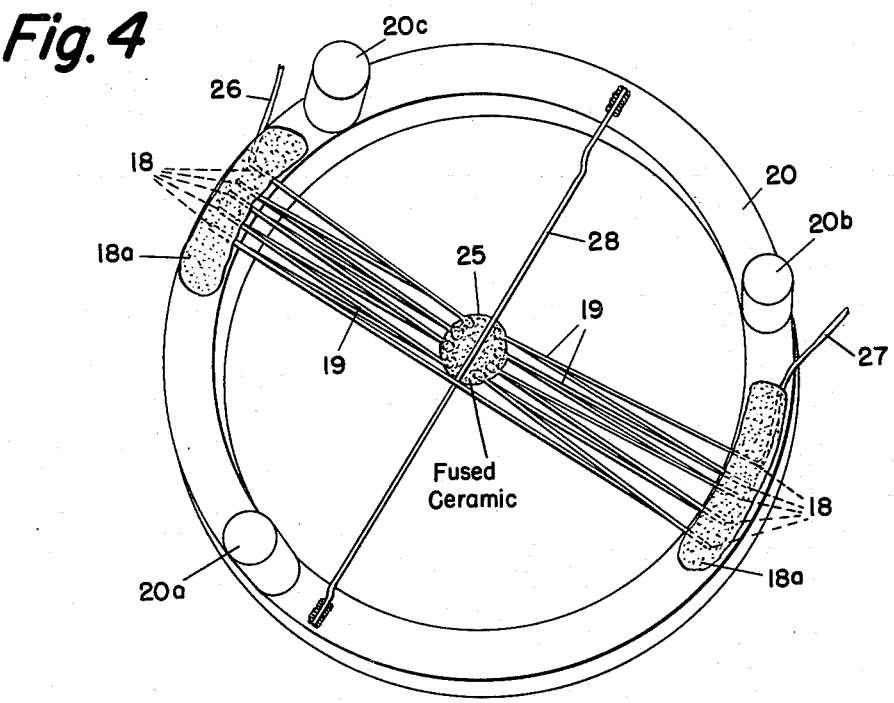
Fig. 4 is a perspective view of the sensitive element and associated parts of Fig. 1, greatly enlarged.

With the above understanding of the elements of the radiation pyrometer thus far described, attention will now be directed to the thermopile itself, the materials of which it is made, the proportioning of the parts, and the thermal and electrical functions of the parts which are best shown in the enlarged isometric view of Fig. 4. The several thermocouples 19, four of them extending radially to the right and four to the left respectively of the target 25, have their hot junctions intimately in thermal contact with the target 25 but electrically insulated therefrom. More particularly, the target or radiation receiver 25 includes a platinum disc to which is secured, as by a ceramic glaze, a disc of mica. The hot junctions of thermocouples 19 are secured to the mica disc in like manner. Preferably a small quantity of powdered black ceramic material, known as a frit, is placed on the mica disc. Upon application of heat the frit is melted to form a fused coating to secure the hot junctions to the mica disc and to provide a black radiation-absorbing surface facing the mirror 13.

It is well understood by those skilled in the art that the electromotive force generated between the output conductors 26 and 27 by the eight thermocouples connected in series-aiding relation will vary in magnitude with change in the difference between the temperature of the hot or measuring junctions at the target 25 and the temperature of the cold or reference junctions 18. When no radiation from an external source is directed to the hot junction target 25, it is desired that no electromotive force shall appear between output conductors 26 and 27. Such a result will always obtain when the hot junctions and the cold junctions are at the same temperature. However, those skilled in the art have long been concerned with the problem of correcting or eliminating a voltage output when the thermopile is subjected to a sudden change in ambient temperature which produces a difference in temperature between the hot junctions and the cold junctions. More particularly, if the temperature of the cold junctions should suddenly rise above or fall below the temperature of the hot junctions, there will be produced a corresponding or appreciable change in electromotive force, which change may disappear when conditions equalize. However, if the temperature of the instrument is maintained at a level different from that of other objects in its vicinity, for example, if it is partially in contact with a cold surface and partially in contact with a hot surface, there will be a continuous flow of heat through the instrument, which can produce a sustained output signal, if the cold and hot junctions are not on the same isothermal. From the foregoing it will be understood that a transient error as well as a sustained error may be introduced even when no radiation from a hot body is incident on the hot junctioin target or receiver 25. The foregoing factors do not adversely affect operation of the pyrometers disclosed herein by reason of the structural provisions including ring 20, its pins 20a—20c, housing 21, and plate 14.

When a thermopile is receiving radiation at a constant rate and has reached a condition of equilibrium, its hot junction target will be losing heat at exactly the same rate as it is receiving it. Accordingly, the manner in which the hot junction target loses heat is of prime importance. There are three modes or channels of heat-loss: (1) gaseous, by conduction and convection; (2) conduction, through solid materials, such as the thermocouple elements themselves; and (3) re-radiation, from the target to the walls of the enclosing cavity and through the window or opening 14a.

The foregoing may be mathematically stated for a condition of equilibrium as follows:

$$E_r = L_g + L_s + L_r \tag{1}$$

where $E_r$ = radiant energy input to the target
$L_g$ = gaseous losses
$L_s$ = solid conduction losses
$L_r$ = radiation losses Both the gaseous losses and the solid conduction losses follow Newton's law of cooling, that is, the rate of each loss is proportional to the temperature-difference; in the one case proportional to the temperature-difference between the target and the atmosphere within the thermopile housing 21 which is substantially at the temperature of the cold junctions and at ambient temperature in general because of the action of the copper enclosure 21 and its heat-conducting mounting; and in the other case proportional to the temperature-difference between the hot junction target 25 and the ring 20 which likewise is maintained substantially at ambient temperature by means of the restricted heat-conducting mounting including projections or legs 20a, 20b and 20c and legs 14b. The radiation loss is in accordance with the Stefan-Boltzman law. However, the usual range of temperature difference between the hot junctions and the cold junctions is generally below 60° F. Accordingly, radiation loss can be approximated by Newton's law of cooling instead of taking into account the difference between the fourth powers of the respective hot and cold junction temperature (absolute). Since the fraction of the loss by radiation is small, this makes the approximation more accurate.

Two other factors are of importance in thermopiles particularly adapted to pyrometric temperature measurement. First, the sensitivity should be high. For greater sensitivity, there should be minimized the rate of transfer or loss of heat from the hot junction target 25. Secondly, the speed of response should be high. Since this will depend upon the time required for the hot junction target 25 to attain its final temperature, it is desirable to reduce its heat capacity. This is done by reducing its thermal mass.

The thermocouple wires are selected for high thermoelectric power, resistance to oxidation, uniformity of drawing and the constancy and reproducibility of their thermoelectric power characteristic. Thermocouples of Chromel and constantan alloys meet the foregoing requirements, and even for small sizes, have adequate strength. The slope of their temperature-electromotive force curve increases with increasing temperature. Heretofore, it has been necessary with Chromel-constantan thermocouples to utilize a compensating coil connected across the output wires of the thermopile in order completely to compensate for change in ambient temperature. With a compensating coil arrangement, the measuring system for the thermopile is converted from one of an electromotive force type to one of a current-measuring type even though there be measured a drop of potential across the compensating coil due to thermopile current flowing through that coil. In contrast, in accordance with the present invention, the electromotive force of the thermopile is measured. There is not measured a potential drop due to current flow from the thermopile. When the output electromotive force is balanced by an equal electromotive force from a potentiometer circuit, there is zero current-flow in the thermopile circuit.

In accordance with the present invention, the thermopile is completely compensated for change in ambient temperature without the use of a compensating coil by control of the flow of heat between the hot and cold junctions. In accordance with one form of the present invention, there is utilized one or more Chromel-constantan thermocouples. The Chromel alloy and the constantan alloy have positive temperature coefficients of thermal conductivity, that is, as the temperature of each increases, it becomes a better conductor of heat; whereas, iron, nickel and, in fact, most pure metals have negative temperature coefficients of thermal conductivity, that is, as their temperatures increase, they become poorer conductors of heat. Accordingly, it will be seen that with a Chromel-constantan thermocouple, a rise in ambient temperature causes a decreased rise in the temperature of the hot junctions over that of the cold junctions because of an increase in the conduction of heat by both the Chromel and the constantan. This decreased rise in the hot junction temperature relative to the cold junction temperature will develop with rising ambient temperatures, whereas in the case of thermocouples including elements of copper, iron or other relatively high heat-conducting elements in combination with antimony, the effect will be to decrease the heat-flow from the hot junction, and the hot junction temperature will rise faster than the cold junction temperature.

In one form of the present invention the fully compensated thermopile is provided by a thermal shunt 28 which modifies and controls the flow of heat in such manner as to make the operation of the thermopile substantially independent of ambient temperature change. Thus, there is avoided the need of a compensating coil connected across the output conductors of the thermopile with its consequent disadvantages.

The thermal shunt 28 of Fig. 4 functions independently of the electrical components and yet by its flow-control of heat modifies the output of the electrical components in compensation for changes in the ambient temperature and the like.

In the absence of a compensating coil and of a thermal shunt, the effect of the positive temperature coefficient of heat conductivity, both for air and for the solid conductors, will be to increase the relative amount of flow of heat from the hot junction region 25 to the cold junction region 18 with rise of ambient temperature. Such a disproportionate rise in thermal conductivity means that the actual temperature of the target 25 will be somewhat less than it should be in order to maintain the temperature difference between the hot and cold junctions needed to produce the desired electromotive force. However, by adding the thermal shunt formed by the nickel wire 28, the total thermal impedance as the ambient temperature rises does not decrease to the same degree as before its addition. Accordingly, the temperature rise of the hot junction area formed by the target 25 will be more nearly in keeping with ambient temperature rise than it would otherwise be with only positive coefficient paths, because of the proportionately less loss of heat through the nickel at the higher temperatures. With less relative heat loss, the temperature of the hot junction area will be higher and the electromotive force output will also be higher. Full compensation can be provided by proper proportioning of the size the the nickel wire 28 forming the thermal shunt in relation to the other heat losses and with given sizes of the Chromel and constantan wires.

While dimensions and detail design specifications will hereinafter be presented for typical modifications of the invention, an explanation will now be given of underlying theory and a procedure by means of which the invention may be applied to a wide range of materials with either positive or negative coefficients of heat conductivity, and by means of which fully compensated thermopiles and other devices may be produced in the absence of a separate element forming the thermal shunt, such thermopiles and devices including heat-conduction paths established in accordance with the present invention.

The equilibrium equation for the thermopile has already been expressed as follows:

$$E_r = L_g + L_s + L_r \qquad (1)$$

It is well known that within the temperature range of 0° C. to 200° C. the conduction of heat over the solid paths, as through the thermocouple elements, and the conduction of heat through the atmosphere can be represented by Newton's law of cooling which states that the magnitude of the conducted heat energy between any two points in a thermal system is dependent upon the temperature-difference between said two points. It is also well known that the thermal conductivity over the foregoing temperature range of most gases or solids varies in a linear fashion with change in temperature level. It is also well established that provided the magnitude of the radiation loss is small with respect to the solid conduction losses and with respect to the gaseous losses the radiation loss can be considered as following Newton's law of cooling within very narrow limits of error. Accordingly, any term on the right-hand side of Equation 1 can be written in the form:

$$L = M(1 + mT)\Delta T \qquad (2)$$

where
$L$ = component loss,
$M$ = thermal conduction of the heat-loss path at the arbitrary reference level,
$m$ = temperature coefficient of thermal conductivity,
$T$ = ambient temperature above an arbitrary reference level, and
$\Delta T$ = temperature-difference between the two points of conduction, and substituting equivalent terms in Equation 1, it takes the following form:

$$E_r = [G(1+gT) + S(1+sT) + R(1+rT)]\Delta T \qquad (3)$$

where $G$ = gas loss factor involving receiver area, dimensions of housing and physical properties of the gas in the housing,
$g$ = temperature coefficient of gas loss,
$S$ = solid conduction factor involving length, cross-sectional area and specific heat conductivity of solid supports of the receiver,
$s$ = temperature coefficient of solid conductivity,
$R$ = radiation loss factor,
$r$ = temperature coefficient of radiation loss, and
$\Delta T$ = temperature-difference between the hot and cold junctions.

The voltage developed by a thermopile as affected by ambient temperature change may be expressed in terms of temperature-difference between the hot and cold junctions in a form similar to Equation 2, namely:

$$\Delta V = N(A + CT)\Delta T \qquad (4)$$

where A and C are temperature-voltage constants depending on the materials which makes up the thermocouples, $N$ represents the number of thermocouples, and $\Delta V$ is the voltage change for a small change in temperature, $\Delta T$, and is generally expressed in microvolts.

The constants A and C may be determined in the following manner. The temperature-voltage relationship for a single thermocouple is expressed by the equation:

$$\Delta V = (A + CT)\Delta T \qquad (5)$$

Assuming now a Chromel-constantan thermocouple and at a reference level of 60° F., which for purposes of calculation may be taken as $T_0$, or $T=0$, the output $\Delta V$ may be taken as a zero reading. For a rise in temperature of one degree, the output will increase by thirty-three microvolts. Transposing the terms of Equation 5, it can be written, $$\frac{\Delta V}{\Delta T} = A + CT \qquad (5a)$$

Since at the reference level, T is assumed to be zero and since the temperature rise was one degree, by substituting the foregoing values in the foregoing Equation 5a there is obtained, $$33 = A + 0 \qquad (5b)$$

For temperatures of one hundred degrees and of one hundred and one degrees, above the reference level, the outputs $\Delta V$ will be 3450 and 3486, a difference of thirty-six microvolts. By using the foregoing determination of the constant A, and substituting its numerical value of 33 in Equation 5a together with the data obtained at the higher level, the following steps are performed in determination of the constant C:

$$36 = A + 100C \qquad (5c)$$

or $$36 = 33 + 100C \qquad (5d)$$

and $$C = 0.03 \qquad (5e)$$

The ratio of $\Delta V$ to $\Delta T$, with the units as above given, represents the change in voltage in microvolts per degree of change in temperature in degrees F. The constant A, accordingly, is defined in terms of microvolts per degree F. Since in the determination of C the term (36—33) is divided by temperature, 100° F., the constant C is in terms of microvolts per degree per degree F., commonly written as — per degrees F.[2]. Because later used, it is now to be noted that the ratio of C to A provides a numerical value per degree F. The ratio of A to C represents degrees F. With the foregoing background, the next step will now be taken, by combining Equations 3 and 4 to obtain a further expression for $\Delta V$: specifically, $$\Delta V = \frac{N(A+CT)E_r}{G(1+gT) + S(1+sT) + R(1+rT)} \qquad (6)$$

If the thermopile is to be made independent of change in ambient temperature, then the rate of change of its voltage output with respect to the rate of change in ambient temperature should be zero. A condition for $\Delta V$ to be independent of changes in ambient temperature (i. e., the value of T) can be mathematically expressed by the equation:

$$\frac{d\Delta V}{dT} = 0 \qquad (7)$$

In performing the mathematical operations upon Equation 6 as indicated by Equation 7, use is made of the well-known formula, from differential calculus, namely, $$d\left(\frac{u}{v}\right)=\frac{vdu-udv}{v^2}$$

However, if it is required that $$d\left(\frac{u}{v}\right)$$

shall be equal to zero, then $vdu-udv$ shall also equal zero. That being so, it will be seen that $vdu=udv$. Accordingly, there may now be performed the differentiation of Equation 6 with the foregoing in mind and remembering that $$\frac{d\Delta V}{dT}$$

shall be equal to zero. Hence, the numerator of the right-hand side of Equation 6 may be taken as "$u$" in the above formula and the denominator as "$v$." In performing the above operations, it will be observed that $$\frac{d\Delta V}{dT}$$

can only be zero when $$C(G+S+R)=A(Gg+Ss+Rr)$$

or $$\frac{C}{A}=\frac{Gg+Ss+Rr}{G+S+R} \quad (8)$$

By inverting, Equation 8 can also be written as follows:

$$\frac{A}{C}=\frac{G+S+R}{Gg+Ss+Rr} \quad (8a)$$

The right-hand side of Equation 8a expresses a ratio of the sum of the respective heat loss factors of all heat paths to the sum of the respective products of each of said heat loss factors and the respective temperature coefficients of thermal conductivity of each of said paths. The derivative of $\Delta V$ with respect to T, when T is equal to zero, becomes $$\frac{d\Delta V}{dT}=\Delta V\left[\frac{C}{A}-\frac{Gg+Ss+Rr}{G+S+R}\right] \quad (8b)$$

As will be later explained, the dimensioning is such that there is established equality between the foregoing ratio and the ratio represented by the left-hand side of Equation 8a, namely, that of temperature voltage constant A to temperature voltage constant C, those two constants having values which satisfy Equation 5.

It will be recalled that a greater sensitivity of the thermopile is obtained by reducing the transfer or loss of heat from the hot junction area or target 25. A thermopile which has high sensitivity will ordinarily comprise conductors having small cross-sectional areas, and later examples will be given of thermopiles constructed of wires of 1 mil diameter and less. After selection of the small diameter wires for high sensitivity and after decision as to the materials to yield high thermoelectric power for maximum output of the thermopile, the conditions set forth by Equation 8 provide for the further dimensioning of the wires of the conductors included in the thermopile to provide the ambient-free temperature characteristics.

Since Equation 8, from a mathematical standpoint, establishes the fact that the thermopile will be ambient-temperature independent if the physical dimensions and the physical constants of the materials of the thermopile have the proper values to satisfy the condition set forth by Equation 8, there will now be presented the manner in which such physical dimensions and/or physical constants can be ascertained.

Again referring to Equation 8a, it will be recalled that the constants A and C have already been determined. In order to obtain the values of the remaining six unknown constants, use is made of six simultaneous equations of the general type of Equation 6. These equations are written in view of the procedures to be utilized to obtain the needed data to establish the values of the six unknowns remaining in Equation 8. The six equations are as follows:

$$\Delta V_a=\frac{NAE_r}{G+S+R} \quad (6a)$$

$$\Delta V_b=\frac{N(A+100C)E_r}{G(1+100g)+S(1+100s)+R(1+100r)} \quad (6b)$$

$$\Delta V_c=\frac{NAE_r}{S+R} \quad (6c)$$

$$\Delta V_d=\frac{N(A+100C)E_r}{S(1+100s)+R(1+100r)} \quad (6d)$$

$$\Delta V_e=\frac{NAE_r}{G+S+2R} \quad (6e)$$

$$\Delta V_f=\frac{N(A+100C)E_r}{G(1+100g)+S(1+100s)+2R(1+100r)} \quad (6f)$$

Equation 6a takes the form shown since the measurements are all made at the reference level of 60° F., and hence, the term "T" of Equation 6 is in each case zero.

In all of the measurements to be made of the voltage output of the thermopile a radiation input signal $E_r$ of known and constant intensity will be applied to the target of the thermopile, that is, the radiation-receiving area thereof. In accordance with the foregoing, and with the ambient temperature at 60° F., the voltage output of the thermopile determines the magnitude of the term $\Delta V_a$ of Equation 6a. It will later be seen that $\Delta V_a$ will be expressed in terms of microvolts. Since $E_r$ represents a radiant energy input to the target of known and constant intensity and since the losses, Equation 1, will equal the received radiant energy, the intensity may be expressed in microwatts for $E_r$, and the losses can similarly be expressed in microwatts.

For Equation 6b the ambient temperature will be increased 100° F. to a new temperature of 160° F. and a new voltage output obtained which will determine the value of $\Delta V_b$.

The radiation receiver or target 25 will then be evacuated in conventional manner, the housing for the pyrometer already having been described as capable of being sealed for subatmospheric operation. For this measurement, the pressure should be less than one ten-millionth of an atmosphere. There will then be obtained $\Delta V_c$ of Equation 6c, for an ambient temperature at the reference level of 60° F. (which makes $T=0$ in Equation 6 and also makes $G=0$).

For Equation 6d the same measurement will be repeated with the thermopile under the same vacuum, but with an ambient temperature 100° F. above the reference level for determination of $\Delta V_d$.

In the foregoing measurements no structural changes are needed in the thermopile. It may be here mentioned that the radiation-receiving face of the receiver or target 25 is blackened as by the fused ceramic frit. For the next measurements needed to determine $\Delta V_e$ and $\Delta V_i$ of Equations 6e and 6f, a structural change is made, specifically the other face of the target or radiation receiver 25 will be blackened, and with both faces thereof black, measurements are made at the reference level of 60° F. and 100° F. thereabove, as at 160° F. By blackening both faces of the radiation receiver 25, the radiation loss is made twice the value (2R, Equation 6e) of that with but one face of the receiver blackened. It may be observed that while only one face of radiation receiver 25 received radiant energy, in all of the foregoing operations of known and constant intensity, the blackening of the surface of the target which does not receive radiant energy only affects its emissivity and, hence, the blackening of the back face thereof doubles the radiation loss.

There will now have been determined $\Delta V$ for each of Equation 6a to 6f.

Since $E_r$ in each of the six Equations 6a to 6f is known, the six simultaneous equations now contain only six unknowns, namely G, S, R, g, s, r, which can be determined by simultaneous solution. Because of selection of the units, each of the foregoing unknowns G, S and R will be expressed in terms of microwatts per degree F., while the unknowns g, s and r will have the dimensions of per degree F.

It will now be assumed that a thermopile of suitable construction has been tested and the values of G, S, R, g, s and r determined. It will be further assumed that the thermopile is not compensated, i. e., its output varies with change in ambient temperature. It will be recalled that for ambient temperature-independence, Equation 8 must be satisfied. In accordance with the present invention, Equation 8 may be satisfied by adding to the thermopile a thermal shunt, such as shunt 28 of Fig. 4. Further assuming that C and A have been determined for the thermopile in question, the addition of the thermal shunt of conductance S' and coefficient of thermal conductivity s' of proper sign and known value will supply terms to Equation 8 which will meet its requirements, for example.

$$0 = \frac{C}{A} - \frac{Gg + Ss + Rr + S's'}{G+S+R+S'} \quad (9)$$

Since the only unknown in Equation 9 is S' (s' being known for the selected material), it can be ascertained. The resultant conductance S' is related to the dimensions of the thermal shunt of one or more paths and to its conductivity, that is to say:

$$S' = \frac{NPA}{L} \quad (10)$$

where

N = number of shunt paths
P = heat conductivity of the material of the thermal shunt
A = cross-sectional area of each shunt path
L = length of one shunt path (from target to ring).

Accordingly, the dimensions of the thermal shunt may be readily ascertained.

Pursuant to the foregoing, the thermopile in Figs. 1–5 was provided with a thermal shunt formed by a nickel wire of .005 inches in diameter, the Chromel-constantan wires each being made of wire 2 mils in diameter flattened to 1 mil thickness. The larger diameter of the pins 20a, 20b and 20c extending from the ring 20 was .049 inch, the length thereof from the ring to the plate 14 being .106 inch. It is to be observed there is an air space between the ring 20 and the heat-conductive housing 21, and between the pins 20a—20c of that housing. Thus, substantially all of the heat flow from the ring 20 is limited to the solid heat-conduction paths provided by the enlarged ends of pins 20a—20c. Though the diameter or cross-sectional area of pins 20a—20c can be varied to some extent, it is desirable to have its dimensions of the same order as those herein set forth in relation to the other dimensioning of the associated parts. Thus, the provision of the restricted heat-conducting paths provivded by pins 20a—20c, together with the heat-conductivity housing 21 including its high heat-conductivity closure 21a, has been found to minimize and to overcome substantially entirely rapid or transient effects of the change in ambient temperature, more particularly to prevent the appearance of transient voltages at the output of the thermopile due to such rapid changes.

In this connection it is to be observed that the housing 21 is conductively related to the outer housing 22 through its heat-conductive association with the plate 14. Reference to the dimensioning of the spokes thereof has already been made, and it will be recalled that they provide heat-conductive paths between the housing 21 and the outer housing 22, and thereby limit or make lower the rise of temperature of the housing 21 and the associated assembly when the pyrometer is subjected to an intense radiation field. Because of the physical construction referred to, the spokes of the plate 14 may be made larger than would otherwise be the case to provide better heat-conducting paths. The thickness of the housing 21 is determined in relation to the diameter of the pins 20a—20c and the dimensioning of the ring 20. Since the effect upon the thermopile and the function thereof in avoidance of transient voltages due to rapidly varying changes in ambient temperature is dependent upon the interrelation of these parts, it is to be understood that they may be varied so that different dimensions can be utilized for each, other than those in a typical embodiment where the housing 21 was made of copper of .025 inch thickness, the ring 20 of .049 inch radially and .094 inch axially. More particularly, if the thickness of housing 21 be increased, the diameter of the legs 20a—20c will be increased, or they may remain the same diameter, in which case the thermal capacity of the ring 20 will be decreased as by axially shortening it or making it of less radial thickness, or the materials may be selected in terms of their relative heat conductivity and heat capacity.

It is believed it will now be helpful to present a numerical example which will be done in terms of the modification of Fig. 8, constructional details of which will be later presented and which comprises eight Chromel-constantan thermocouples of 3 mil diameter wire size. The constants G, S, R, g, s, r, C and A, determined as above indicated, are as follows:

$G = 129$ microwatts per degree F.
$S = 129$ microwatts per degree F.
$R = 5.3$ microwatts per degree F.
$g = .0009$ per degree F.
$s = .002$ per degree F.
$r = .005$ per degree F.
$\frac{C}{A} = .0009$ per degree F.

Inasmuch as the Chromel-constantan thermopile will not be compensated, it will be assumed that copper will be selected for the thermal shunt. Accordingly, $$s' = -.00007 \text{ per degree F.}$$

The foregoing values may be inserted in Equation 9 since that equation expresses the conditions which must be met to provide a thermopile whose output will not vary with change in ambient temperature. The only unknown from Equation 9 will be S'. Solving Equation 9 for the values of S', there will be obtained:

$$S' = 174 \text{ microwatts per degree F.}$$

It is now only necessary to substitute the value of S' in Equation 10 since it can be arbitrarily decided that four thermal shunt paths will be provided, i. e., $N=4$, the conductivity of the copper from which it has been decided to construct the thermal shunt being known, i. e., $P=4.8$ watts per square inch per inch per degree F., and the length of each shunt path being known, since it will be the distance between the hot and cold junctions of each thermocouple, specifically .25 inch. Accordingly, solving Equation 10 for A, the area, there will be obtained:

$$A = 2.3 \times 10^{-6} \text{ square inches}$$

this corresponding with a wire size of 1.7 mils diameter. In practice, it has been found that a thermal shunt of 2 mil diameter is highly satisfactory and avoids any change in the output of the thermocouple due to change in ambient temperature between the range of 60° F. and 160° F. Thus, there is close correlation between the mathematical explanation of the underlying theory and the experimental verification thereof.

In terms of Fig. 1, and further substantiating the underlying theory of the present invention, the constants applicable to the thermopile of Figs. 1–5 comprising the eight thermocouples, each of Chromel-constantan flattened 2-mil wires, the constants G, R, g, s, r and $$\frac{C}{A}$$

will be the same as set forth above. Constant S will be equal to 57 microwatts per degree F.

In accordance with the invention, the use of a nickel shunt will be preferred inasmuch as it has a more negative temperature coefficient of conduction than the copper and, hence, will adequately perform its corrective function with a smaller conducting factor than copper and, thus, there will be less loss of heat at all temperatures due to the provision of the thermal shunt of nickel instead of copper. The constant s' for the nickel shunt will be equal to $-.0002$ per degree F. In accordance with Equation 9, S' may be determined to be 77.3 microwatts per degree F.

As indicated in Figs. 1–5, there will be two shunt paths each having a length of .25 inch, and the specific heat conductivity of the nickel will be equal to .746 watt per square inch per inch per degree F.

Solving Equation 10, for the area A, there will be obtained a value of $12.2 \times 10^{-6}$ square inches, this corresponding with a nickel shunt of approximately 4 mils diameter. In practice, a 5 mil diameter nickel shunt for the two paths was found fully to compensate the thermopile or to provide a voltage output independent of change in ambient temperature.

Applying the foregoing analysis to the modification of Fig. 7, the calculations indicated an area for the thermal shunt equal to $4.2 \times 10^{-6}$ square inches. In practice this area was provided by using two 2 mil nickel shunts and two 1 mil nickel shunts, the total cross-sectional area of the nickel shunts being $3.9 \times 10^{-6}$ square inches, thus showing a further confirmation of the theoretical basis for the present invention.

For some applications, the speed of response of the thermopile of the modifications of Figs. 1–5 may be higher than desired. In such event, additional discs may be attached to the target 25 to add thermal mass. However, for thermopiles of greater speeds of response than of the type shown in Figs. 1–6, the modification of Fig. 7 may be utilized where the speed of response will be greatly increased over that of the earlier modification. As shown in Fig. 7, a wire 19 of Chromel alloy one mil in diameter flattened to one-half mil thickness, is brazed or spot welded at one end to a small square target or radiation receiver 25a of nickel, one-tenth mil in thickness and twenty mils on a side. The opposite end of the wire 19 is spot welded to the end of a copper conductor 26 which is itself secured to the face of ring 20 by a ceramic frit 18a in manner described in connection with Fig. 1.

The other element of the thermocouple comprises the wire 19a of constantan likewise comprising a wire flattened to one-half mil from an original diameter of one mil. One end is spot welded to the target 25a and the other end spot welded to a copper conductor 27 which is similarly secured to the face of ring 20 by a ceramic frit 18a.

In accordance with the invention as already explained, there is provided a thermal shunt which achieves operation of the radiation-responsive device unaffected by change in ambient temperature. With a ring 20 of about 0.2567 inch radius, the same as for the modification of Figs. 1–5, the thermal shunt comprises two conductive paths 28, 28 formed by a single nickel wire two mils in diameter and extending diametrically across ring 20 with the central portion thereof spot welded to target 25a. The thermal shunt also includes conductive paths 28a, 28a formed by a second wire of nickel one mil in diameter and similarly extending diametrically across ring 20 with the mid-portion spot welded to target 25a. Since there is provided welded construction at the target 25a, the ends of the wires forming the heat-conductive paths are secured to the upper face of ring 20 in intimate and good heat-exchanging relation therewith by a ceramic frit. The frits 18a provide electrical insulation between the ring 20 and the wires welded to target 25a. Though the ends of the wires 28 and 28a, shown as divided wires welded to target 25a, could be secured in electrically conductive relation to ring 20, the insulated arrangement is preferred in order not electrically to ground any part of the sensitive element of the heat-responsive device. Such a heat-responsive or radiation-responsive device has been found satisfactorily to function with an output independent of an ambient temperature which changes within the range of from 60° F. to 160° F.

By providing the thermocouple elements 19 and 19a of relatively small cross-sectional area, greater sensitivity is achieved since for a given intensity of radiation applied to the target 25a the rise in temperature of the hot junctions will be greater due to less conduction of heat therefrom. Since both the Chromel and constantan wires have large positive temperature coefficients of heat conductivity, any rise in their temperature as by change in the ambient temperature, increases their heat conductivity and tends to increase the effectiveness of the conductive heat path provided by them. However, because of the small diameter of each wire the effect is of a low order, much less than it would be if the wires were of three mil diameter since there is a high thermal impedance established by the small cross-sectional area of each path. Accordingly, it will be seen that the degree of compensation needed will be correspondingly less and, therefore, the thermal shunts provided by the wires 28 and 28a, which are needed, are of small cross-sectional area and there is a relatively small transfer of heat through the thermal paths which means that there is a relatively small loss of sensitivity by reason of the inclusion of the thermal shunts.

A heat-responsive device of the type shown in Fig. 7 has also been constructed utilizing Chromel-constantan wires of one-half mil diameter flattened to approximately one-quarter mil thickness. In accordance with the present invention, a thermal shunt of a single wire, such as the wire 28 of Fig. 7, of nickel, of two mil diameter has been found satisfactory in producing an output which is independent of change in ambient temperature through the aforesaid range.

A further heat-responsive device of the type shown in Fig. 7 has been constructed utilizing Chromel constantan wires of 1 mil diameter flattened to approximately one-half mil in thickness, together with a single diametral nickel shunt formed of a nickel wire of 2 mils diameter. The construction is the same as shown in Fig. 7 with the omission of the 1 mil nickel wire 28a, 28a, and with the area of the target or receiving area 25a, 0.031 inch in diameter and one-tenth mil in thickness, and the inner diameter of ring 20 is reduced to 0.218 inch, with corresponding reductions and changes in size of the parts shown in Figs. 1–3 and 5. This high-speed radiation-sensitive device operates independent of change in ambient temperature to within plus or minus one per cent throughout the range of at least 60° F. to 300° F. The speed of response is 99.9% of full response in nine-tenths of a second. Without using the optical system of Fig. 1 but with the target 25a of Fig. 7 twelve inches from a square opening, one inch on a side, in front of a "black body" at 1800° F., the output is of the order of 30 microvolts. A smaller nickel shunt (the 2 mil wire) as against the larger nickel shunt comprising the 2 mil wire plus the single mil wire first described in connection with Fig. 7 provides the needed compensation since it is more effective by reason of its decreased length (each path about one-tenth of an inch as compared with 0.25 inch).

Referring to Fig. 8, the ring 20 is made somewhat larger than the corresponding ring of earlier modifications and in Fig. 8 the ring 20 is made of constantan.

Extending radially from a central target 25 are a plurality of constantan wires 50 which are attached at their opposite ends to the ring and to the target as by a ceramic frit in manner already described. There is welded to the inner end of each constantan wire 50 an end of Chromel wires 51 which are respectively soldered at their opposite ends to the constantan wires 50 at points spaced inwardly from the ring 20, each Chromel wire being, of course, connected at one end to one radial wire and at the opposite end to the adjacent radial wire of constantan. The soldered connections at the outer ends of constantan wires 51 are made relatively massive as by using a fairly large drop of solder to assure good heat dissipation from the cold junctions formed thereby. A lead wire 52 is soldered to a constantan wire 50a which forms a part of a thermocouple with the adjacent Chromel wire 51. Similarly, the other lead wire 53 is soldered to a Chromel wire 51a which joins the adjacent radially extending constantan wire 50 to form another thermocouple assembly. The soldered connections of the leads 52 and 53, of course, form a cold junction.

Pursuant to the present invention, with chromel-constantan wires of three mil diameter the output of the thermopile may be made independent of change in ambient temperature by providing in manner already described four thermal shunts 54, 55, 56 and 57 each formed by copper wire of two mil diameter. These thermal shunts form heat-conduction paths between the receiver 25 and alternate cold junctions of the thermopile, being electrically insulated therefrom at one end as by ceramic frits.

Referring to Fig. 9, the ring 20 may correspond with the similarly numbered ring of the modification of Figs. 1–5. In this modification of the invention, radially extending thermocouple elements 50 are formed by constantan wires of three mil diameter. They are secured to the target 25 in the same manner as described in connection with Fig. 8 with their opposite ends secured to the ring 20 by ceramic frits.

In Fig. 9 there are four wires 51 of Chromel each three mils in diameter, and there are four wires 55 of copper of two mils diameter. Hence, it will be seen that there are heat-conduction paths between the hot junction of the target 25 and the cold junction of ring 20 through three differing materials; that is, through the Chromel wires, the constantan wires and the copper wires. In accordance with the invention, there has been combined in the modification of Fig. 9 the function of the thermal shunt with wires forming a part of the electrical system of the thermopile. That is to say, the addition of the copper wire to the Chromel-constantan combination provides the heat-conducting paths which result in an output of the thermopile independent of change of ambient temperature over the aforesaid range of from 60° F. to 160° F. without the need to provide thermal paths separate and independent from the electrical network. The underlying theory applicable to Fig. 4 which has already been set forth at length is equally applicable to the modification of Fig. 9, the copper wires then being considered as the paths providing the thermal shunt referred to in said theory.

Reference has already been made to the fact that by decreasing the diameter of the wires forming each thermocouple, the impedance of the heat-conducting path therethrough is greatly increased. If the wires are made quite small, the impedance will limit to a negligible degree the amount of heat ($L_s$) which may be conducted therethrough. Stated differently, the heat losses due to heat conduction through the wires will then be of minor importance compared with the gaseous losses. If the thermopile be constructed of fine wires such as eight two mil diameter copper-constantan thermocouples, there will be over-compensation because most of the heat will then flow through the copper which has a temperature coefficient of conductivity of negative sign. That is to say, the output, with change in ambient temperature of such a thermopile, will increase with increase in ambient temperature. In accordance with the present invention, the thermopile of Fig. 9 will be fully compensated by utilizing constantan wires 50, each of three-tenths mil diameter, and using all associated thermocouple wires of copper of three-tenths mil diameter, the copper providing the needed thermal-shunt or negative-coefficient corrective action with its effect diminished by an amount which provides compensation without over-compensation. If finer wires than the three-tenth mil diameter were used, the effect of the conductive paths with the negative coefficient would be further diminished and the thermopile would be under-compensated, that is, the output voltage will decrease with increase of ambient temperature.

The thermal shunt or equivalent heat-conducting path will be equally effective for thermopiles where the gaseous losses are of major magnitude. Since gaseous losses increase with rising ambient temperature, when they are a major factor, the conductive path provided by the thermal shunt will be of a material introducing a compensating action in the opposite direction.

Referring to the modification of Fig. 10, it will be observed there is provided a ring 60 and that there extend across the ring a plurality of thermocouple elements 61 which, in conjunction with the diagonally extending thermocouple elements 62, form differentially connected thermocouples. That is to say, the diagonally extending elements 62 are at corresponding ends secured to the elements 61 and as by ceramic frits (not shown) to an underlying target or radiation receiver 63, whereas the opposite ends of said diagonally extending elements or wires 62 are likewise secured to adjacent wires 61 and by ceramic frits (not shown) to a second target or radiation receiver 64. Lead wires 65 and 66 are connected to the outermost wires 61, a voltage appearing across the output of the thermopile whenever the temperature of the junctions at target 63 differs from the temperature of the junctions at the target 64. In order to make the output voltage across the leads 65 and 66 independent of change in ambient temperature there can be provided in accordance with the present invention thermal shunts 67 and 68, thermally interconnecting the targets 63 and 64, the thermal conduction factor of the thermal shunting paths 67 and 68 being determined in generally the same manner as above set forth in connection with Figs. 1–8.

It is also to be understood that individual thermocouples in the differential thermopile may be selected of materials which will of themselves perform the functions of the thermal shunts 67 and 68 in manner already set forth in connection with Fig. 9.

Reference has already been made to the desirability of selecting a thermal shunt with the proper sign for the coefficient of thermal conductivity. For example, where the solid heat-conduction paths formed by the thermocouple elements both have temperature coefficients of conductivity which are positive in sign, a thermal shunt having a coefficient of negative sign will ordinarily be indicated. Conversely, in a thermocouple such as copper-constantan, copper-antimony or bismuth-antimony, the thermal shunt will preferably be made of a material having a positive coefficient of thermal conductivity and thus may be made of constantan, Chromel, or the like.

From the foregoing discussion it will be seen that by predetermining the heat loss of each path and with suitable selection of materials having the needed negative or positive coefficients of thermal conductivity, the loss of heat from the target area may be regulated to compensate for changes in the output of the heat-sensitive element due to a changing ambient temperature; or, as previously described, the heat-sensitive device is made ambient-temperature free. The invention is not limited in its application to thermopiles consisting of one or more thermocouples, but can be applied to other arrangements for receiving energy from a radiant body and from that energy to provide measurement of the intensity of the radiation and the temperature of such a body. For example, in Fig. 11 a temperature-sensitive element 70 may comprise a component of an electrical circuit having an electrical characteristic which is varied with change in the intensity of radiant energy applied thereto. Such radiation or heat-sensitive devices are well known to those skilled in the art and include impedance-changing elements, thermistors and resistor elements, such as the bifilar-wound coil 70 of Fig. 11, which it will be observed is cemented to a target 70a as by a ceramic frit or cement, or the coil itself may comprise the entire target or radiation-receiving region or area.

The arrangement of Fig. 11 utilized with a suitable optical system such as shown in Figs. 1 and 2 is referred to as a bolometer. For high sensitivity, the sensitive element 70 comprises fine wire, preferably of iron, platinum, copper or nickel. If iron wire or a metallic strip be used it should be a pure iron such as that sold under the name of "Puron." With change in its temperature as by change in the radiation directed to it, there is substantial change in its electrical resistance. However, a change in radiation directed to element 70 at one temperature produces a resistance change differing from that produced by the same change of radiation with the element 70 at a substantially different temperature. Thus, the device is subject to error due to change in the ambient temperature and of a nature generally similar to those described in connection with the thermopile.

If it be assumed that radiant energy $E_r$ of constant intensity is directed upon element 70, there will be loss of heat at the same rate at which it is received when equilibrium conditions obtain. The paths through which heat is lost include solid, gaseous and radiation paths from element 70 and target 70a. As shown in Fig. 11, the ends of the coil 70 extend from the target 70a and are electrically and mechanically connected to adjacent ends of copper strips 71 and 72 which at their opposite ends are electrically insulated from, but in good thermal exchange relation with, the supporting ring 20, as by ceramic frits 18a. The ring 20 is of the same construction as that of Fig. 4 and, hence, has been given the same reference character. Thus, the two leads from the coil 70 form two of the solid conduction paths and in accordance with the present invention a thermal shunt 73, preferably of nickel wire, provides a third path for flow of heat. In some cases greater mechanical strength may be desired for the support of the element 70, in which case a fourth conductive path may be provided by extending the thermal shunt 73 diametrically across ring 20 in the manner of the thermal shunt 28 of Fig. 4.

Since the element 70 is effective as a primary measuring element by reason of the change of its resistance, and inasmuch as its resistance will depend directly upon its temperature whether receiving radiation or not, it is utilized with an electrical system which has been shown in the form of a Wheatstone bridge. The element 70 forms one arm of the bridge and in the adjacent arm of the bridge there is provided a coil or resistor 74 of iron wire in intimate heat relation with ring 20; it may be cemented to a face of that ring or wrapped around it as shown in Fig. 11, the turns being electrically insulated therefrom, but by use of cement 178b being in good thermal contact therewith. The remaining two arms of the bridge include resistors 75 and 76 of manganin or the like. Preferably, the resistances of resistors 75 and 76 are high in comparison with the resistances of coil 74 and of element 70. The coil 70 and the coil 74 are designed to have identical electrical resistance values though, of course, by the use of suitable resistors in shunt and series relation with them their effective resistance values in the bridge can be brought to equality.

With equality established between the resistance of element 70 and that of coil 74, it will be understood that resistors 75 and 76 will be made equal. Under such conditions and in the absence of radiation to the element 70 the bridge will be balanced and no voltage will appear across output conductors 80 and 81 by reason of current flow to the bridge from a source 82 and regardless of change in ambient temperature. It will be observed that the source 82 has included in series relation therewith an ammeter 83 and an adjustable resistor 84. The resistor 84 is adjusted until a predetermined current flows through the ammeter 83.

If it now be assumed that radiation of predetermined and known intensity be directed upon the element 70, a potential difference will appear between conductors 80 and 81.

A potentiometer circuit 85 including a battery 86, a variable resistor 87 and a slidewire resistor 88 is then adjusted by relatively moving the resistor 88 and its contact 88a until the potential difference appearing between output conductors 80 and 81 is balanced by an opposing potential difference developed from the end of the resistor 88 connected to conductor 80 and the contact 88a. The balance between the two voltages will be known when the detector D, which may be electronic, or a galvanometer, does not indicate an output, or does not deflect but remains at its zero or "null" position. By establishing a predetermined ratio between the current flowing to the bridge and the current flowing through resistor 88, a scale 90 may be calibrated directly in terms of temperature or intensity of radiation received by the element 70. That current ratio can be established in any suitable manner as by including an ammeter 89 in the potentiometer circuit 85 and adjusting its current to a predetermined value, the same purpose for the ammeter 83 having been already described. The detector D may be either of the type disclosed in Williams Patent No. 2,113,164 or of the type disclosed in Squibb Patent No. 1,935,732 and in either case may include the scale 90 as a component part of a recorder having a record chart 91 driven by constant-speed motor 92.

Continuing the assumption that radiation of predetermined intensity is directed on element 70, the output will not be wholly free from the effects of change in ambient temperature unless the heat losses from element 70 are adjusted in magnitude and sign to compensate for deviations in change of the resistance value due solely to changes in the ambient temperature and not compensated for by the effect of coil 74 in the network. Stated differently, with radiation of constant intensity directed on element 70, the potential difference developed between conductors 80 and 81 will not be constant with change in ambient temperature. However, by providing a thermal shunt or its equivalent as embodied in the leads themselves, the voltage output $\Delta V$ will remain constant with change in ambient temperature. The theory in brief as applied to the bolometer and the manner in which the dimensioning of the leads and the thermal shunt are made to establish the desired losses throughout wide changes in the ambient temperature will now be set forth.

Specifically, it will be shown that Equation 8 column 11 can be used to calculate the proper balance along the heat-flow paths between the receiving area 70a of Fig. 11 and the ring 20 which is substantially at the temperature of the housing.

In Fig. 11, it will be recalled that the current flow (I) through resistors 70 and 74 is maintained constant. It is maintained constant because of the relatively high resistance values (1000 ohms each) of resistors 75 and 76 and also of resistor 84 (375 ohms) in comparison with that (2.5 ohms each) of resistors 70 and 74. A change $\Delta R$ in resistance of element 70 will give rise to a change $\Delta V$ in the potential difference between conductors 80 and 81. With the resistance values of resistors 75 and 76 high as compared with resistors 70 and 74, the following equation expresses the relationship with the required accuracy:

$$\Delta V = \frac{I}{2} \Delta R \tag{11}$$

(the "2" in denominator appears because of the voltage-divider action of the Wheatstone bridge). Where the unbalance potential $\Delta V$ is due to a difference $\Delta T$ in the temperature of element 70 with respect to element 74, the equation is written:

$$\frac{\Delta V}{\Delta T} = \frac{I}{2}\left(\frac{\Delta R}{\Delta T}\right) \tag{12}$$

The resistance of the sensitive element 70 of the bolometer can be measured as a function of its temperature, or the resistance R can be derived from the resistivity of iron, recalling that $$R = \frac{pd}{a} \tag{13}$$

where $p$ = resistivity of the material (iron wire) in micro-ohm centimeters,
$d$ = length of the wire in centimeters, and
$a$ = cross-section of the wire in square centimeters.

Resistivity values are available in the "Handbook of Chemistry and Physics," 31st ed. (1949), page 1981. Analysis of these data shows that the change in resistivity $p$ with temperature may be expressed as $$\frac{\Delta p}{\Delta T} = (J + KT) \tag{14}$$

where J and K are temperature-resistance constants depending on the material of which the sensitive element is made. Hence, $$\frac{\Delta R}{\Delta T}=\frac{d\Delta\rho}{a\Delta T}=\frac{d}{a}(J+KT) \quad (15)$$

or $$\Delta R=\frac{d}{a}(J+KT)\Delta T \quad (16)$$

Now, with constant current I, and referring to Equation 11, $$\Delta V=\frac{I}{2}\Delta R=\frac{Id}{2a}(J+KT)\Delta T \quad (17)$$

Since $$\Delta V=(A+CT)\Delta T \quad (5)$$

then $$A=\frac{IdJ}{2a} \quad (18)$$

and $$C=\frac{IdK}{2a} \quad (19)$$

Also, $$\frac{C}{A}=\frac{K}{S} \quad (20)$$

The relations of Equation 3 may now be used for the bolometer.

To determine $$\frac{C}{A}$$

it is seen that it is only necessary to determine $$\frac{K}{J}$$

The value of $$\frac{\Delta R}{\Delta T}=A$$

can be obtained from data available in the aforementioned "Handbook of Chemistry and Physics," page 1981. For example, from the handbook it will be seen that for −100° C. the resistivity of 99.98% pure iron is 5.92 microhm centimeters. For +100° C., the resistivity is 16.61; for +200° C., the resistivity is 24.50; and for 400° C., the resistivity is 43.29. For the temperature difference −100° C. to +100° C., a range of 200°, the change in resistivity is 10.69, the quotient being .0540, the resistivity change per degree C. over the indicated range, equal to $$\frac{\Delta R}{\Delta T}=A$$

Similarly, the change in resistivity for the next range of 100° is 0.0789 per degree C., while for the last range of 200° the change is 0.0940. If these latter values $$\frac{\Delta R}{\Delta T}$$

showing the change in resistivity per degree C. be plotted against the temperature in centigrade, $$\frac{\Delta R}{\Delta T}$$

at 60° F. can be ascertained to be 0.0574. If the value of $$\frac{\Delta R}{\Delta T}$$

be taken at an elevated temperature, say 260° F., it will be found to have a value of 0.0724. The difference between the two will be 0.015, and to ascertain the value of the constant K per degree Fahrenheit, it is only necessary to divide the difference of 0.015 by 200, thus obtaining 0.000075.

Since K and J have now been determined, the ratio of $$\frac{K}{J}$$

is 0.000075 divided by 0.0574, the result being 0.001308 per degree Fahrenheit and this may be expressed in per cent as 0.131% per degree F. This is the value $$\frac{C}{A}$$

for the bolometer.

If now the bolometer of Fig. 11 be operated without a shunt and through a change in ambient temperature from 60° F. to 260° F., it will be found that the voltage output with radiation of constant intensity on the target 70a decreases; it will be less (negative in sign) than at the lower temperature, and less by 2.73% of the output $\Delta V$ at said lower temperature. The decrease represents the numerical value of $$\frac{d\Delta V}{\Delta V}$$

where $d\Delta V$ is the change in output with said 200° change in temperature. The coefficient per degree is obtained by dividing 2.73% by the change $dT$, namely 200°, and, hence, will be −0.0136% per degree F. The foregoing coefficient is equal to $$\frac{1}{\Delta V}\frac{d\Delta V}{dT}$$

Preferably the potential output of the bridge is measured with the ambient temperature at the assumed zero.

The procedure for the thermopile and for the bolometer can be simplified by grouping the terms. The terms of the expression $$\frac{Gg+Ss+Rr}{G+S+R} \quad (21)$$

need not be determined individually. It is to be observed that the losses through the solid conduction paths have negative coefficients because of the fact that the leads to the element 70 are of iron.

Let $W=(G+S+R)$ and $\lambda$ equal a coefficient which when multiplied by W equals the numerator of the above expression (21), then $$\frac{Gg+Ss+Rr}{G+S+R}=\frac{W\lambda}{W}=\lambda \quad (22)$$

It has been shown in connection with Equation 8b that $$\frac{1}{\Delta V}\frac{d\Delta V}{dT}=\frac{C}{A}-\frac{Gg+Ss+Rr}{G+S+R} \quad (23)$$

Hence, $$\frac{1}{\Delta V}\frac{d\Delta V}{dT}=\frac{C}{A}-\frac{W\lambda}{W} \quad (24)$$

The coefficient $$\frac{1}{\Delta V}\frac{d\Delta V}{dT}$$

having been determined and $$\frac{C}{A}$$

also having been determined, $$-0.0136\% = 0.131\% - \lambda \quad (25)$$

and $$\lambda = 0.1446\% \text{ per degree F.} \quad (26)$$

Though $\lambda$ has now been determined, Equation 24 may not be solved to determine the value of W. However, there can be added arbitrarily to the bolometer a thermal shunt having a conductance $S'$ and a coefficient of thermal conductivity $s'$. With such an addition to the bolometer, Equation 24 may then be written with $\Delta V'$ representing the voltage change for a small change in temperature $\Delta T$, and as follows:

$$\frac{1}{\Delta V'} \frac{d\Delta V'}{dT} = \frac{C}{A} - \frac{W\lambda + S's'}{W + S'} \quad (27)$$

Dividing both the numerator and the denominator of the right-hand term by W, there is obtained $$\frac{1}{\Delta V'} \frac{d\Delta V'}{dT} = \frac{C}{A} - \frac{\lambda + \left(\frac{S'}{W}\right)s'}{1 + \left(\frac{S'}{W}\right)} \quad (28)$$

The determination of the coefficient $$\frac{1}{\Delta V'} \frac{d\Delta V'}{dT}$$

is made in the same manner as above explained and the equation then solved for $$\frac{S'}{W}$$

In the foregoing, with the bolometer provided with a 5 mil diameter nickel wire shunt, $$\frac{d\Delta V'}{\Delta V'}$$

was found to be $+6.00\%$ for a $200°$ F. rise in ambient temperature; and $6.00\%$ divided by $200 = +.03\%$ per degree F. The bolometer was over-compensated; that is, the output at the higher ambient temperature exceeded the output at the reference temperature. Solving the above Equation 28, $$.03 = 0.131 - \frac{0.1446 + \left(\frac{S'}{W}\right)(-0.02)}{1 + \left(\frac{S'}{W}\right)}$$

$$\frac{S'}{W} = \frac{0.0436}{0.121} = 0.360$$

The value $$\frac{S'}{W} = 0.360$$

expressed the ratio of heat conductivity of the nickel shunt to the original total heat conductivity of the gaseous solid and radiation paths at the reference temperature.

In order to ascertain the dimensions of the thermal shunt which produces a response free of ambient-temperature effects, it will be remembered that $$\frac{1}{\Delta V} \frac{d\Delta V}{dT}$$

must be equal to zero, and hence, $$\frac{C}{A} = \frac{\lambda + n\left(\frac{S'}{W}\right)s'}{1 + n\left(\frac{S'}{W}\right)} \quad (29)$$

where $n$ is the ratio of the heat conductance of the required shunt to the heat conductance of the shunt utilized in the last-described measurement, and, $$0.131 = \frac{0.1446 - .0072n}{1 + 0.360n}$$

$$n = 0.25$$

The value of $n$ indicates the heat conductivity should be one-quarter that of a 5 mil shunt; and that provides the answer that a shunt of 2.5 mils diameter substituted for the 5 mil shunt will provide ambient-temperature free operation. In practice, a 2 mil diameter shunt was found to be satisfactory.

The alternative procedure for the bolometer can be used for the thermopile and as already stated the technique set forth for the thermopile can be used for the bolometer.

In the embodiment of the invention of Fig. 11 the target diameter was 1.7 millimeters, the length of the leads of .002 inch diameter and flattened from target to copper terminals 2.4 mm.; the copper terminals 2.6 and 2.8 mm. (of No. 36 copper wire flattened) respectively; the nickel ring 20 was $\frac{15}{32}$ inch internal diameter; and the 2.5 mil diameter nickel shunt was from target to ring 5.1 mm. in length.

As in the case of the thermopile, the bolometer, too, can be made ambient-temperature free without a thermal shunt by properly applying the teachings of the present invention as heretofore expressed. Specifically, the copper leads 71 and 72 of Fig. 11 when joined to the iron wires from the sensitive element 70 with lengths of the latter about 1.1 millimeters long measured from the edge of the target, the desired ambient-temperature free operation will be attained. Since the nickel shunt has a negative coefficient of thermal conductivity and since iron also has the negative coefficient of thermal conductivity, by shortening the lengths of the leads, the effectiveness of the coefficient is made greater and, hence, the iron wires themselves provide the necessary correction which in the earlier embodiment was attained by the addition of the thermal shunt of nickel.

As above pointed out in description of the Wheatstone bridge of Fig. 11, both the current to the bridge and the current through the temperature-sensitive resistors 70, 74 remained essentially constant and, accordingly, the output voltage ($\Delta V$) of the bridge is proportional to the difference ($\Delta R$) between the resistances of resistors 70, 74. By recourse to a modified Wheatstone bridge of type suited to measure a difference in resistance (see, for example, Leeds Patent No. 1,097,651), it is neither necessary to use an external resistance in series with the bridge nor to make the resistances of resistors 75, 76 high with respect to the resistances of thermal-sensitive resistors 70, 74. In such case, $\Delta R$, as measured for balance of the bridge, is itself a direct measure of the radiation received by the target 70a provided that ambient temperature compensation is afforded as above described.

While preferred modifications of the invention have been shown, it will, of course, be understood that once the principles herein set forth are understood, further modifications may be made within the spirit and scope of the appended claims.

What is claimed is:

1. A heat-sensitive device comprising a target having a fine temperature-sensitive resistance element distributed over its surface area and characterized by low loss of heat therefrom, conductors forming electrical connections to said element, solid heat-conduction paths from said element, said heat-conduction paths including said conductors having small cross-sectional areas to minimize loss of heat through them, heat also being lost other than through said solid conduction paths as through a radiation path, said solid conduction paths including a thermal shunt comprising a metallic member having a coefficient of thermal conductivity of one sign, other of said heat-conduction paths having coefficients of thermal conductivity of sign opposite to that of said thermal shunt, and the dimensions establishing the heat loss through each of the paths establishing approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V$ = the voltage change for a small change in temperature, $\Delta T$, and $T$ = the ambient temperature above a reference level.

2. A heat-sensitive device comprising a target having a fine temperature-sensitive resistance element distributed over its surface area and characterized by low loss of heat therefrom, conductors forming electrical connections to said element, solid heat-conduction paths from said element, said heat-conduction paths including said conductors having small cross-sectional areas to minimize loss of heat through them, heat also being lost other than through said solid conduction paths as through a radiation path, said paths including a thermal shunt comprising a metallic member having a negative coefficient of thermal conductivity while other of said paths have positive coefficients of thermal conductivity, and the dimensions establishing the heat loss through each of the paths so that when heat developed by radiation directed upon said element is dissipated through said paths at the same rate as received approximate equality will be established between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V$ = the voltage change for a small change in temperature, $\Delta T$, and $T$ = the ambient temperature above a reference level.

WILLIAM G. FASTIE.

No references cited.